United States Patent [19]

Scata

[11] Patent Number: 5,118,929

[45] Date of Patent: Jun. 2, 1992

[54] BAR-CODE READING DEVICE WITH ARTICLE ORIENTING CONVEYOR BELT

[75] Inventor: Mario Scata, Teramo, Italy

[73] Assignee: Alcatel Face S.p.A., Milan, Italy

[21] Appl. No.: 536,880

[22] Filed: Jun. 13, 1990

[30] Foreign Application Priority Data

Jul. 27, 1989 [IT] Italy ................. 21344 A/89

[51] Int. Cl.⁵ .............. G06K 7/10; B65G 17/32; B65G 29/00; B65G 47/24
[52] U.S. Cl. ...................... 235/462; 198/384; 235/467; 364/478
[58] Field of Search .............. 250/223 R, 224; 235/462, 467, 470; 209/539, 540; 198/734, 803.4, 803.5, 384; 364/478, 479

[56] References Cited

U.S. PATENT DOCUMENTS

| | | | |
|---|---|---|---|
| 3,662,181 | 5/1972 | Hercher et al. | 235/465 |
| 3,774,014 | 11/1973 | Berler | 235/467 |
| 3,923,158 | 12/1975 | Fornåå | 235/449 |
| 4,097,729 | 6/1978 | Seligman et al. | 235/467 |
| 4,176,260 | 11/1979 | Ward et al. | 235/475 |
| 4,187,545 | 2/1980 | Wallace et al. | 364/478 |
| 4,193,540 | 3/1980 | Dougades et al. | 235/467 |
| 4,544,064 | 10/1985 | Felder | 382/61 |
| 4,634,849 | 1/1987 | Klingen | 235/487 |
| 4,649,503 | 3/1987 | Keller | 364/478 |
| 4,713,536 | 12/1987 | Williams et al. | 235/464 |
| 4,832,204 | 5/1989 | Handy et al. | 235/385 |
| 4,896,086 | 1/1990 | Miyahara et al. | 364/478 |

FOREIGN PATENT DOCUMENTS

| | | |
|---|---|---|
| 0119402 | 9/1984 | European Pat. Off. . |
| 2852063 | 6/1979 | Fed. Rep. of Germany ... 198/803.5 |
| 3137572 | 3/1983 | Fed. Rep. of Germany . |
| 0709323 | 1/1980 | U.S.S.R. ............... 209/539 |

Primary Examiner—Stuart S. Levy
Assistant Examiner—Christopher R. Glembocki
Attorney, Agent, or Firm—Spencer, Frank & Schneider

[57] ABSTRACT

A device for the automatic reading of bar-codes comprises a sliding plane whereon a dragging section of a conveyor belt, having a plurality of windows consecutively aligned, is advanced. Each window defines, in the conveyor belt, two orientating edges perpendicularly arranged to form a right angle, whose vertex is oriented opposite to the feed sense of the conveyor belt itself. In each opening there is dropped an article provided with a bar-code to be read by a read head acting at a readout station, towards which the dragging section of the belt is moving. Through the feed of the belt, the article is shifted toward the readout station and is simultaneously arranged with two orthogonal sides in abutment with the orientating edges of the belt, in order to approach the readout station according to a prefixed orientation.

6 Claims, 2 Drawing Sheets

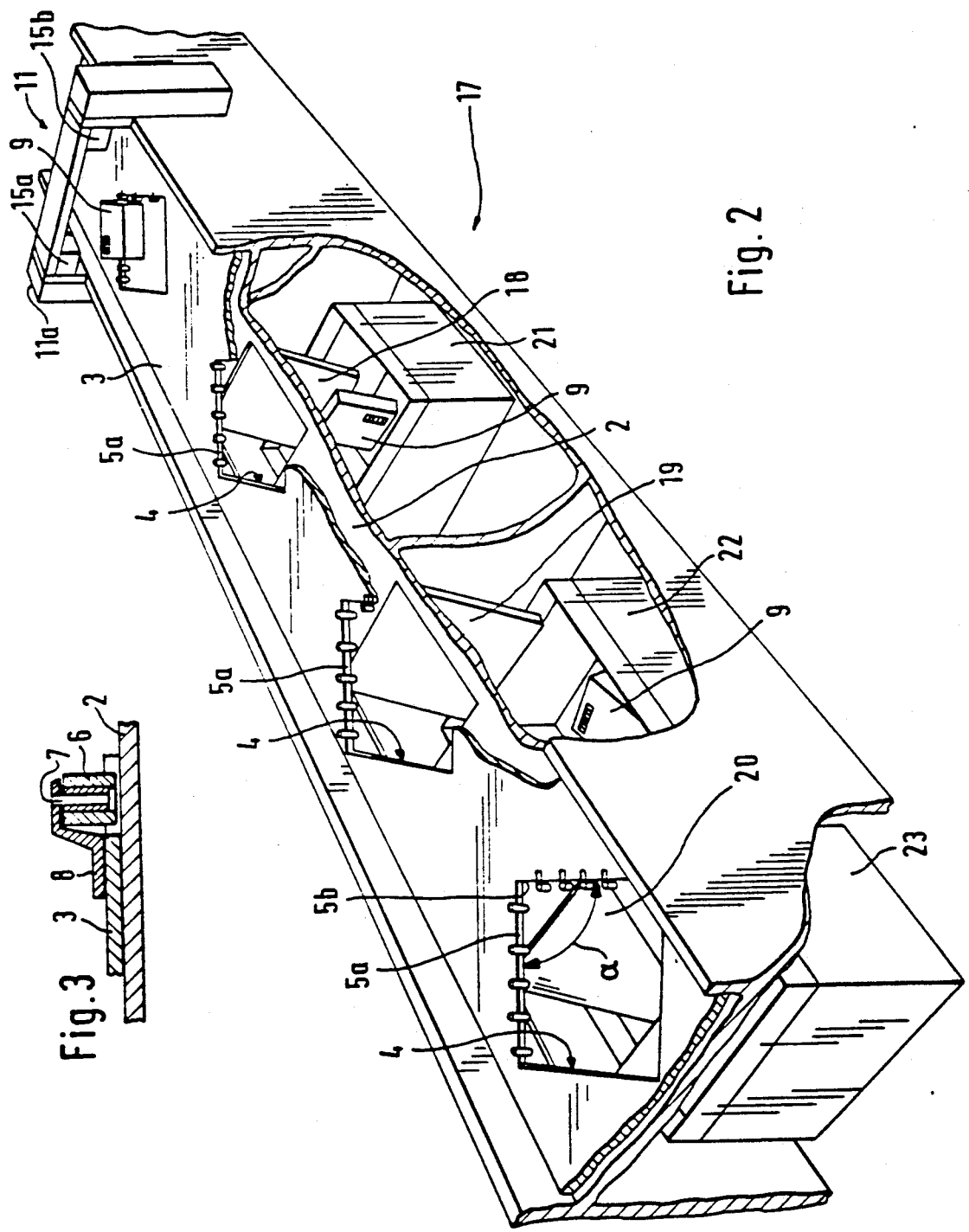

BAR-CODE READING DEVICE WITH ARTICLE ORIENTING CONVEYOR BELT

BACKGROUND OF THE INVENTION

The present invention relates to a device for the automatic reading of bar-codes applied on articles, of the type comprising: a sliding plane whereon the articles, each provided with at least a bar-code applied on at least one if its sides, are advanced in sequence; and at least a read-out station wherein at least a laser beam read head is arranged to read the bar-code applied on the articles travelling on the sliding plane.

Conventional packaging of many products are is provided with the so-called "bar-codes" which allow the identification and/or the classification of the product by means of electronic equipment. These bar-codes are essentially formed by a series of parallel strips of different widths which, according to their consecutively arranged sequence, carry particular coded information which can be interpreted by special read units associated with the above-mentioned electronic equipment.

At the present time, the reading of bar-codes can be performed by means of the so-called "light pens", i.e. by photoelectric cell read units which are manually run over a bar-code. It is clear that this reading method requires the use of manpower which is not a negligible problem.

In order to eliminate this problem, automatic reading systems have been realized wherein the products are advanced, singly and in sequence, on a sliding plane, downstream to an area where a readout station is located. In the readout station one or more laser beam read heads are provided. Alternatively one or more telecameras can be effective to transmit data detected from reading the bar codes to the aforesaid electronic equipment.

Normally, to assure that bar-codes are read irrespective of their orientation at the readout station, a plurality of read heads orientated according to different directions are provided. In this way, there is assured that at least one of the beams emitted by the read heads intersects the bar-code along its whole length and transversally with respect to the strips thereof, in order to detect all the information contained therein.

However, it is to be noted that for a reliable operation of the reading system it is necessary that the dimensions of bar-codes do not decrease below certain values.

This necessity gives rise to a remarkable inconvenience, if in case the bar-codes are to be applied on article packagings of limited sizes and/or contain a considerable amount of informations as, for instance, in the pharmaceutical sector.

In the above instances, the bar-code must have a very accurate orientation with respect to the beam emitted by the read head to be read correctly. Thus, the automated read-out systems, as hereinbefore described, cannot perform effectively their functions.

Hence, it follows that for correctly reading a bar-code of small size and/or containing a considerable amount of information, it is necessary to manually use light pens.

SUMMARY OF THE INVENTION

The main object of the present invention is to eliminate the problems associated with the known art by providing a device capable of orientating, in a very accurate manner, articles moved towards a reading station, in order to assure the correct interpretation of the bar-code even if the latter is of a small size or contains a considerable amount of information.

This object and objects, which will become more apparent in the following description, are substantially achieved by a device for the automatic reading of bar-codes applied on articles, characterized in that it comprises a conveyor belt having a dragging section effective to advance over a sliding plane and being provided with a plurality of windows consecutively aligned along the same. Each window defining, in the belt, an opening having at least two orientating edges perpendicularly arranged to form a right angle whose vertex is oriented opposite to the conveying direction of the conveyor belt. In each of the openings, articles are dropped which lay down on the sliding plane inside one of the windows come in engagement with the belt orientating edges so as to be shifted towards the readout station and, simultaneously, are orientated with two of its orthogonal edges in abutment with the orientating edges, in order to approach the readout station according to a prefixed orientation.

Further characteristics and advantages will be more apparent from the detailed description of a preferred, but not exclusive, embodiment of a device for the automatic reading of bar-codes applied on articles according to the present invention.

BRIEF DESCRIPTION OF THE DRAWINGS

Such description will be taken hereinafter in conjunction with the attached drawings, given as an indicative and therefore not limitative example, in which:

FIG. 2 is a perspective and schematic view partially illustrating the subject device associated with a sorting unit of the articles;

FIG. 3 is an enlarged section illustrating a detail of the conveyor belt provided in the device of the invention.

DESCRIPTION OF THE PREFERRED EMBODIMENTS

Figure 1:
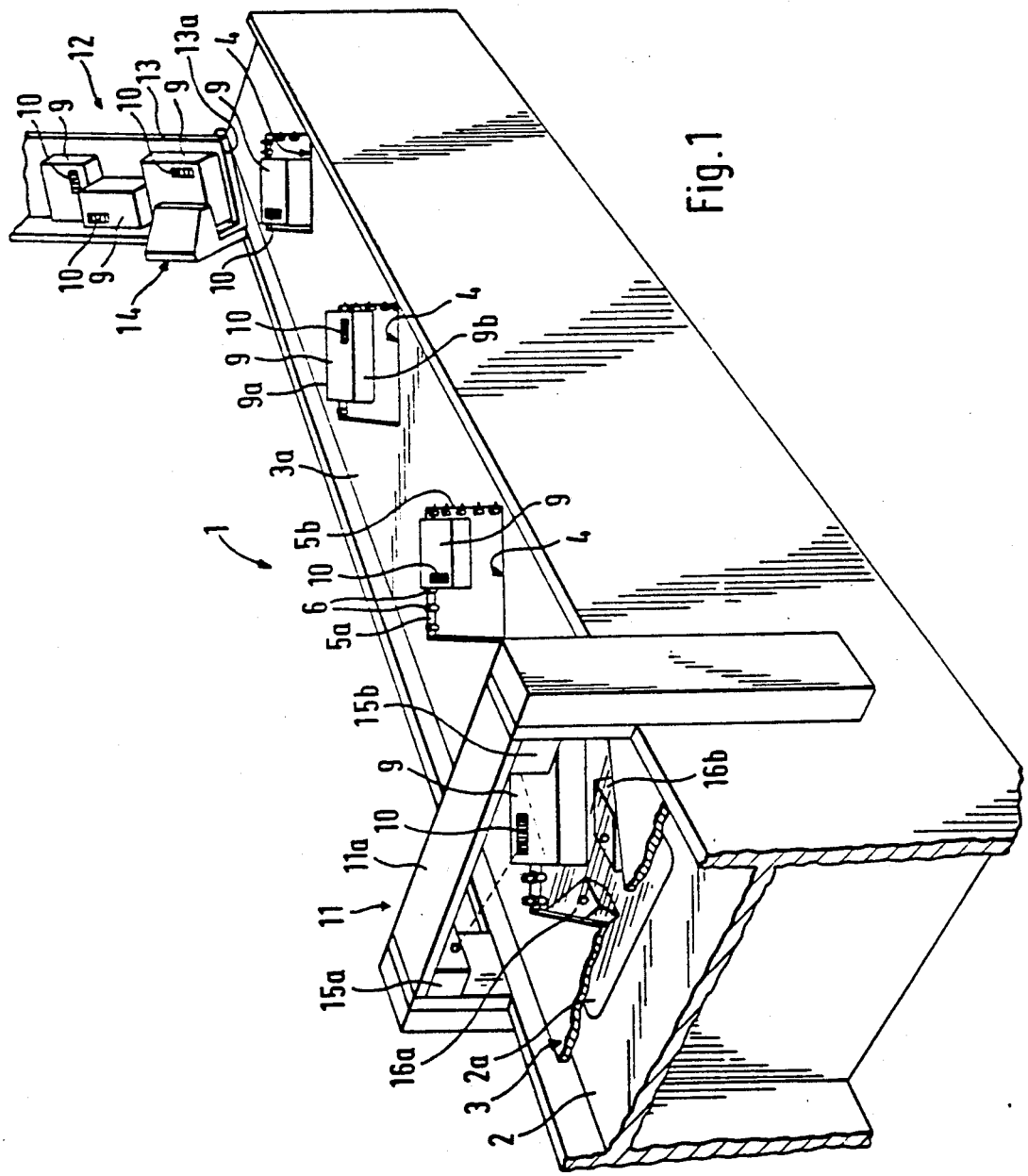
FIG. 1 is a perspective and schematic view of the device according to the present invention.

With reference to the mentioned figures and particularly to FIG. 1, reference numeral 1 designates a device for the automatic reading of bar-codes applied on articles, according to the present invention.

The device 1 comprises a sliding plane 2 over which a dragging section 3a of a conveyor belt 3 is originally advanced.

According to the present invention, there is a plurality of windows consecutively aligned along conveyor belt 3. Each window defines, on the belt itself, at least two orientating edges 5a, 5b perpendicularly arranged to form a right angle α (FIG. 2) oriented, i.e., with its vertex pointing, opposite to the feed direction of the dragging section 3a. In the embodiment shown, the bisecting line of angle α coincides with the longitudinal axis of conveyor belt 3.

Preferably, along each of the orientating edges 5a, 5b, a plurality of sliding rollers 6, mutually placed side by side, are arranged.

As clearly shown in FIG. 3, each roller 6 is rotatably mounted on a pivot 7, supported in turn by a bracket 8 fixed, for instance by a rivet, on the edge 5a,5b of belt 3.

It has been provided that, while the conveyor belt 3 advances, the articles 9 are sequentially laid down on the sliding plane 2, each through one of the windows 4, each article being provided with a bar-code 10 to be read by at least a readout station 11, towards which the belt itself is moving. In the embodiment shown each of the articles 9 is of a parallelepiped configuration, of a limited height, and has its bar-code printed on one its larger sides 9a and located parallel near to one its smaller sides 9b.

Preferably, the discharge of single articles 9 on the sliding plane 2 occurs at a loading station 12 comprising a routing chute 13 extending at an inclined angle, descending towards its lower end 13a which is arranged on the belt 3. The routing chute 13 has, at least at its lower end 13a, an axis substantially parallel to one of the orientating edges 5a, 5b.

The articles 9 are arranged on chute 13 in a backed-up relationship one after the other and, by means of distributing means 14, not described since known per se' and not relevant for understanding of the invention, are singly dropped from the chute itself, each inside one of the windows 4.

The readout station 11 comprises a bearing structure 11a whereon at least one laser beam read head is mounted, which is not further described herein as it is known and of a conventional type. In the illustrated embodiment, two upper read heads 15a, 15b have been provided at opposite sides over the conveyor belt 3 and arranged to perform the reading of bar-codes 10, each read head being arranged in a direction parallel to one of the orientating edges 5a, 5b. Furthermore, it can be advantageous to provide two lower read heads 16a, 16b arranged beneath the sliding plane 2 and capable of performing, through a transparent portion 2a of the sliding plane itself, the reading of bar-codes in a direction respectively parallel to the orientating edges 5a, 5b, when said bar-codes are positioned on the lower surface of articles 9.

In the indicatively illustrated embodiment arranged downstream of the readout station 11 is a sorting unit designated as a whole by reference numeral 17, at which the articles 9 are sorted according to a prefixed sequence, on the basis of data detected from reading the bar-codes 10 at the readout station itself.

As clearly illustrated in FIG. 2, the sorting unit 17 may include for instance a plurality of openable portions 18, 19, 20 made out of, and reciprocally aligned along, sliding plane 2.

Each of the openable portions 18, 19, 20, is swingly pivoted with respect to the sliding plane 2 and can be lowered as shown in FIG. 2, upon command from conventional electronic equipment, known per se', and therefore not described and illustrated, by which the readout station 11 is controlled. By lowering the openable parts 18, 19 20, the articles 9 are selectively dropped into special containers 21, 22, 23 or alternatively, on auxiliary conveyor belts or other collecting means.

As previously mentioned, the operation of the device according to the invention essentially provides that, when one of the windows 4 passes beneath the lower end 13a of chute 13, the article 9 arranged at the end itself is dropped into the window. In this situation, the article 9 is laid down on the sliding plane 2, with the respective bar-code 10 which, according to circumstances, can be situated upwards, as in FIG. 1, or towards the sliding plane itself.

In case only the upper read heads 15a, 15b are used, the articles 9 arranged on the chute 13 must be preoriented with the bar-code situated upwards.

As the chute 13 has its longitudinal axis substantially parallel to one of the orientating edges 5a, 5b, the article 9, laid down into the window 4, is already orientated with its sides substantially parallel to the orientating edges themselves.

Through the feed motion of conveyor belt 3, the orientating edges 5a, 5b come in abutment on the corresponding sides of articles 9, so that one of the article angles coincides exactly with the angle formed by the orientating edges themselves. This operation is made easier by the presence of the sliding rollers 6 disposed along the orientating edges 5a, 5b.

In the situation hereinbefore described, the article 9 is so arranged that its bar-code extends in a direction exactly parallel to one of the orientating edges 5a, 5b.

The article 9 is thus led to the readout station 11 always keeping the aforesaid prefixed orientation, so that its bar-code can be read, without risk of mistake, by one of the upper read heads 15a, 15b or lower ones 16a, 16b, according to its positioning.

Through the operational feed of conveyor belt 3, the article 9 first reaches the readout station, and then subsequently is pushed away from the latter in order to join the sorting station 17. In this step, the electronic equipment from which the readout station 11 is controlled, provides for selectively operating openable portions 18, 19, 20 in order to lay down the article 9 into one of the containers 21, 22, 23, according to data detected from the reading of bar-code 10 associated to the article itself.

Naturally, the fact that a sorting station is operating downstream from the readout station 11 is not binding. The device 1 can be used also to perform the sole reading of bar-codes 10, or to selectively submit the articles 9 to operative steps different from sorting.

The present invention thus achieves the above-mentioned objects.

Indeed, we notice that the device of the present invention is capable of assuring a perfect orientation of the articles in an automatic process, in order that their bar-codes can be read with extreme reliability even when, as often occurs in the pharmaceuticals sector, the bar-codes of the articles must contain a large number of information within very limited space.

Naturally, to this inventions as herein conceived, various modifications and changes, all falling within the inventive sphere, can be introduced.

I claim:

1. A device for automatically reading bar-codes disposed on at least one side of an article, said device comprising:

a sliding plane whereon articles provided with a bar-code are advanced;

a conveyor belt having a dragging section with means for receiving and advancing articles along the sliding plane in a direction of advancement, said means for receiving and advancing including a plurality of windows consecutively aligned in the direction of advancement and defining openings within the conveyor belt, each window opening being defined by at least two linearly extending orientating edges arranged to intersect and form a right angle whose vertex is pointed opposite to the advancement direction, and at least one readout station having at least one laser beam read head arranged to read the bar-codes applied on articles advancing along the slide plane. wherein articles having a bar-code disposed on at least one side of the article are received inside one of the plurality of windows so that the at least one side of the article lays parallel to the sliding plane and as the article is advanced towards the readout station, two orthogonal sides of the article are placed in abutment with the orientating edges, so that the article approaches the readout station in a prefixed orientation.

2. A device according to claim 1, further comprising means for discharging articles on the sliding plane having at least one loading station provided with at least one routing chute extending from said sliding plane at an inclined angle and being arranged over the dragging section of said belt, said at least one chute having at least, at its lower end, an axis orientated in parallel with one of said orientating edges.

3. A device according to claim 1, wherein said readout station comprises at least two upper read heads arranged over the conveyor belt, each head being arranged to read a bar-code parallelly orientated to one of said orientating edges.

4. A device according to claim 1, wherein said readout station comprises at least two lower read heads disposed beneath the sliding plane and arranged to read, through a transparent part of the sliding plane itself, a bar code parallelly orientated to one of said orientating edges.

5. A device according to claim 1, further comprising, disposed along each said orientating edges, a plurality of sliding rollers, each swivellingly connected to the conveyor belt about a vertical axis.

6. A device according to claim 1, further comprising, downstream from the readout station, an operative sorting unit which comprises a plurality of openable portions made out of said sliding plane, each being associated with respective collecting means and being opened selectively, as a function of data detected from the reading of the bar-codes at the readout station, so as to discharge the articles into said collecting means.

* * * * *